March 21, 1944.  P. A. GUENTHER  2,344,509
MULTIPLE TOOL HOLDER
Filed Dec. 15, 1941  2 Sheets-Sheet 1
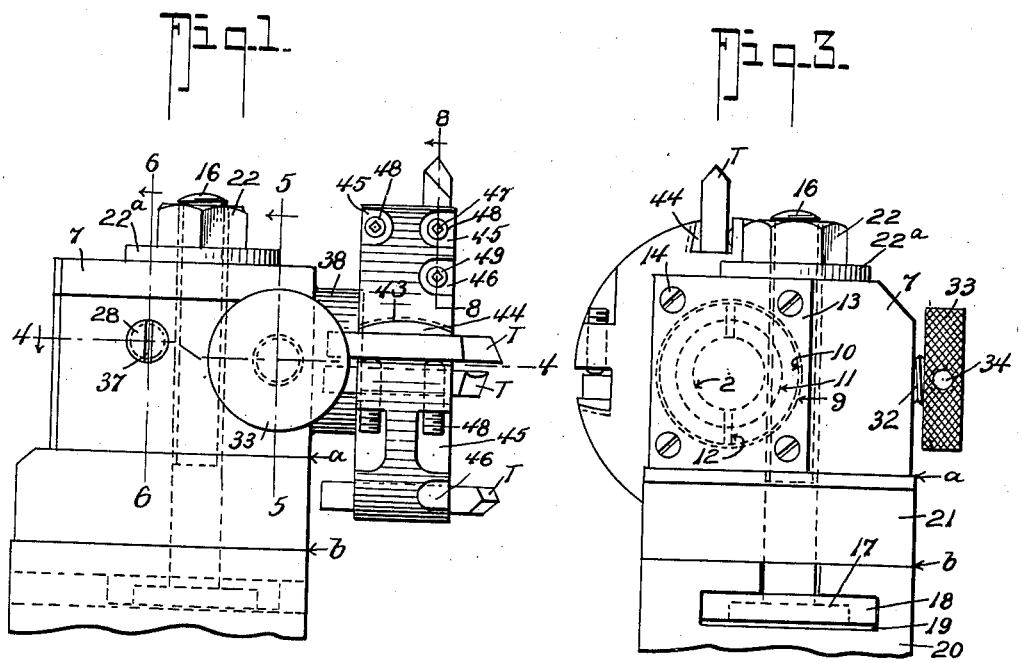
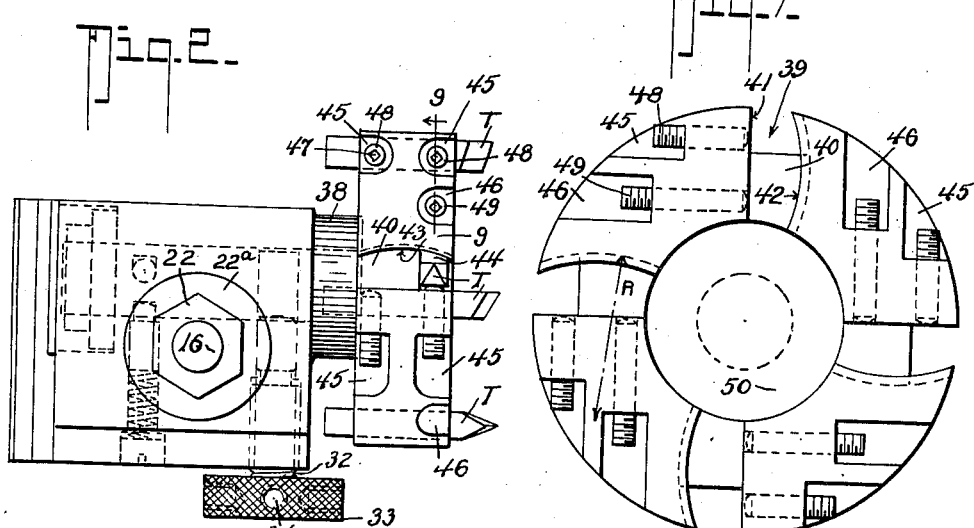
Inventor
Paul A. Guenther
By Albert E. Dieterich
Attorney

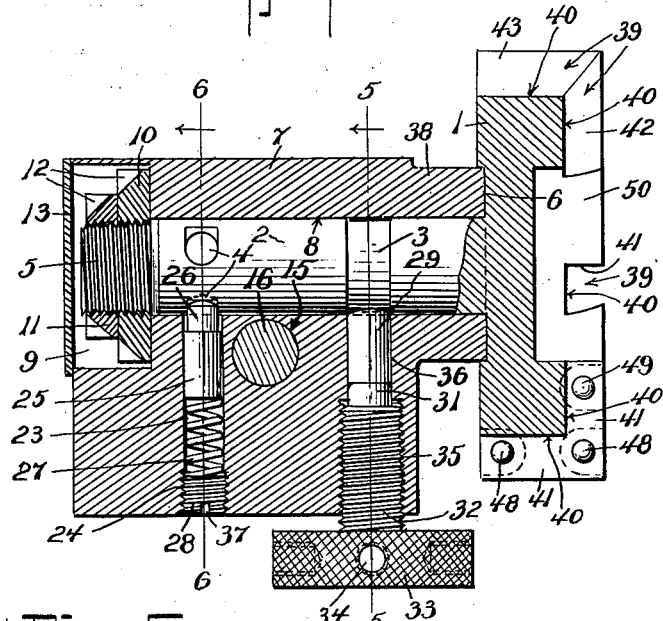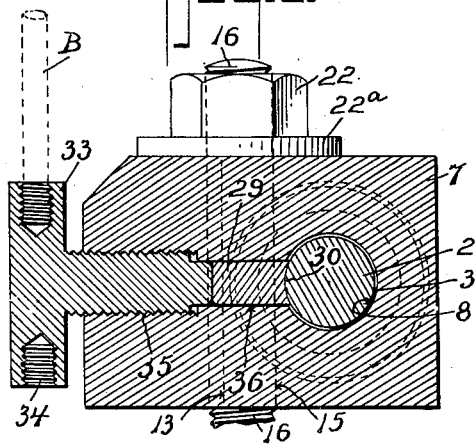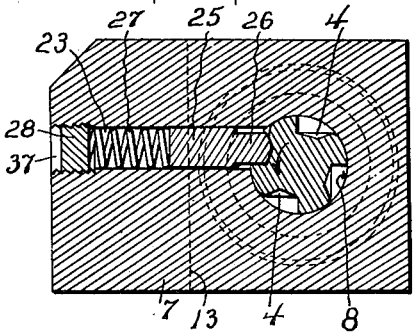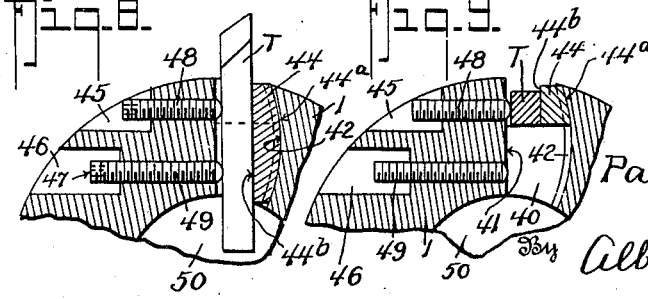

Patented Mar. 21, 1944

2,344,509

UNITED STATES PATENT OFFICE 2,344,509

MULTIPLE TOOL HOLDER

Paul A. Guenther, Houston, Tex.

Application December 15, 1941, Serial No. 423,093

4 Claims. (Cl. 29—48)

My invention relates to certain new and useful improvements in devices for holding a plurality of tools on the slide of a lathe, and it particularly has for an object to provide a tool holder constructed in such manner that a high degree of accuracy in the work being done on the lathe may be maintained and yet a quick and accurate adjustment of the tool-head about its axis may be made when it is desired to change from one tool to another.

More particularly the invention relates to that type of tool holders exemplified by the patents to H. Newmann, No. 1,031,956, of July 9, 1912, and No. 1,195,390, of August 22, 1916.

Other objects of my invention are: to so improve the construction that the moving parts of the device are protected against the metal chips and cuttings which, during the use of the device fall upon it and tend to clog the same and prevent accurate work according to present-day standards of accuracy; to provide a means by which the tool-head may be accurately held for use on lathes having different swings and rigidly secured to the lathe slide so as to remain fixed against accidental displacement; to improve the tool-head in such manner that a more proper relief angle of the cutting tool relative to the work can be maintained; and, in general, to so simplify and improve previously known multiple tool holders of the type stated that the holder may be employed satisfactorily on work requiring the extreme degrees of accuracy demanded by modern machine-stop practice.

Other objects will in part be obvious and in part will be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which—

Fig. 1 is a side elevation of my tool holder.

Fig. 2 is a top plan view of the same.

Fig. 3 is a rear elevation of the same.

Fig. 4 is a horizontal section on the line 4—4 of Fig. 1.

Fig. 5 is a cross section on the line 5—5 of Fig. 4.

Fig. 6 is a cross section on the line 6—6 of Fig. 4.

Fig. 7 is an enlarged face view of the tool-head per se.

Fig. 8 is a detail section on the line 8—8 of Fig. 1, but drawn to the scale of Fig. 7.

Fig. 9 is a detail section on the line 9—9 of Fig. 2, but drawn to the scale of Fig. 7.

Fig. 10 is an elevation of one of the arcuate blocks used in the tool-head.

Fig. 11 is an end view of the block shown in Fig. 10.

Fig. 12 is a plan view of the same.

In the accompanying drawings, in which like numerals and letters of reference indicate like parts in all the figures, I represents the new and improved tool-head which has a spindle 2 mounted in a bore 8 of a block 7. The spindle 2 has an annular groove 3, preferably of shallow depth, and an annular series of four ratchet-recesses 4. The end of the spindle is threaded as at 5 to receive the adjusting nut 10 and jamb nut 11 which are located in the counter-bore or chamber 9 of the block 7 and have kerfs 12 to receive a spanner wrench. The block 7 has a neck 38, the end of which fits into a circular recess 6 in the tool-head 1 (see Fig. 4).

A cover plate 13 is held over the entrance to chamber 9 by screws 14.

The block 7 has a vertical bolt hole 15 to receive the bolt 16 whose head 17 has a cup-washer 18 fitted into the slot 19 of the slide rest 20 of a lathe (not shown). When the device is used with a 9″ swing lathe the block 7 is directly secured to the slide rest 20, but when it is being used on an 11″ swing lathe a spacer block 21 of the required thickness is interposed (see Fig. 3) between the block 7 and the rest 20. A washer 22a and nut 22 serve, with the bolt 16, to secure the block (and the spacer when used) rigidly and securely in place on the slide rest 20.

The block 7 has a horizontal bore 23 located with its axis in a horizontal plane above that containing the axis of the spindle 2, by virtue of which the bore 23 will line up with the ratchet-recesses 4 (see Fig. 6). In the bore 23 is located a reciprocatable pawl 25 and a spring 27. The pawl 25 has a spindle engaging projection or end 26 to fit the ratchet-recesses 4. A screw plug 28 having a kerf 37 is threaded at 24 into the bore 23 to tension the spring 27, as well as to retain the pawl 25 and the spring 27 in the bore 23 closed off from debris (shavings, chips, dirt, etc.).

The block 7 also has a second bore 36 whose axis lies in a plane containing the axis of the spindle 2, i. e., extends radially of the spindle. The bore 36 lines up with the annular groove 3 of the spindle and contains a friction-lock shoe 29 having a spindle contacting face 30 to conform to the curvature of the spindle at the groove 3. There is also provided a threaded counterbore 35 to receive the clamp screw 32. The screw 32 has a reduced non-threaded end 31 to enter the bore 36 and engage the shoe 29, and a knurled head 33, the latter being, preferably, provided with radial tapped recesses 34 to receive a turning rod or key B (see Fig. 5).

The tool-head 1 is in the nature of a disc and is divided into four operative parts set 90° apart. These parts are composed of tool receiving recesses 39 disposed four in a vertical plane and four in transverse directions (see Figs. 4 and 7).

Each recess 39 has a base wall 40 and a radial wall 41 (Figs. 9, 4 and 1) composed of plane surfaces. Each vertical recess 39 also has an arcuate wall 42, while each transverse recess 39 has an arcuate wall 43. The walls 42 and 43 cooperate with arcuate segment blocks 44, each having a curved face 44ª to fit the curvature of the walls 42 and 43 and a flat face 44ᵇ (Figs. 2 and 8 to 12 inclusive).

The tool-head 1 also has a set of recesses 45 to receive the short set screws 48 and a set of recesses 46 to receive the long set screws 49. The screws 48 and 49 have squared sockets 47 to receive a wrench by which the screws may be tightened or loosened as desired.

The tools T are located between the blocks 44 and are clamped tightly in place by the pairs of screws 48—48 or 49—49, as the case may be. By loosening up one of the pair of screws and tightening the other the tool may be adjusted to the proper height or held at different angles, as occasion may require, whereby fine adjustment of the relief angle may be had.

When in use, spindle 2 is so positioned that pawl projection 26 lies squarely in a recess 4 of the spindle and screw 32 is tightened up so as to force shoe 29 into tight engagement with the spindle and with sufficient pressure to prevent the accidental turning of the spindle from its initial position of adjustment.

When another tool is to be brought into position for use, screw 32 is loosened and tool-head 1 is turned by hand, by quarter turns until the tool desired is in position for use, whereupon screw 32 is again tightened to hold the spindle 2, and consequently head 1, from turning.

From the foregoing description, taken in connection with the accompanying drawings, it will be observed that all moving parts of the tool, such as the head 1 against block 7, spindle 2, pawl 25—26, and shoe 29, are entirely enclosed and no chips, shavings, grit or dirt can get into the same to interfere with the accurate working of the parts individually and the device as a whole.

The cavities 39 of the tool-head 1 are self-clearing and, even if they should fill up with debris after the tools T have been secured and adjusted in the head, such filling of the grooves would do no harm, nor in any way throw the device out of adjustment.

If desired, the tool-head 1 may have a recess 50 in its face to permit long tools to be held in a vertical plane and project into the recess (see Fig. 8).

In Figs. 1 and 3 of the drawings *a* indicates the top of a 9″ swing lathe slide rest, while *b* indicates the top of a 11″ swing lathe slide rest.

From the foregoing description, taken in connection with the accompanying drawings, it is thought that the construction, operation and advantages of my invention will be clear to those skilled in the art.

What I claim is:

1. In a multiple tool holder, a block, means to secure the block to the slide rest of a lathe, said block having a neck and a spindle receiving bore passing through the neck, a tool-head having a spindle located in said bore and having an annular recess to fit over the end of said neck, said spindle having an annular locking groove wholly enclosed in said block and having an annular series of ratchet-recesses wholly enclosed in said block, means enclosed within a chamber in said block for holding said spindle against movement along its axis while leaving the spindle free to be turned, a longitudinally movable spring-pressed pawl carried by and wholly enclosed in said block to engage in said ratchet-recesses, a clamp shoe mounted in and enclosed by said block to engage said annular locking groove, and a screw plunger carried by the block to engage said clamp shoe to force it into holding engagement with the spindle.

2. In a multiple tool holder, a tool-head comprising a body having a spindle, a block in which said spindle is mounted for rotary adjustment, said body having at least one set of connected grooves, one groove of the set being located in the periphery of the body and the other groove of the set being located at right angles to the first groove and in the face of the body, each of said grooves being defined by a flat base wall and a flat back wall normal to the base wall and an arcuate wall opposite the back wall, block segments to fit each of said grooves and each having an arcuate face to fit said arcuate walls and a flat face to oppose said flat back walls, and clamp screws carried by said body to project through said flat back walls and engage a tool placed in said grooves against said block segments and adjustably secure the same in place.

3. In a multiple tool holder, a tool-head comprising a body rotatable for adjustment about its axis, said body having a set of grooves in its front face and a set of transverse grooves in its periphery, the grooves of a set being spaced an equal number of degrees apart, each groove being defined by a flat base wall, a flat back wall normal to the base wall and an arcuate wall opposite the back wall, said body having clamp screw recesses and bores, the latter opening through said back wall, set screws in said bores, and an arcuate segment block having an arcuate wall to register with said arcuate wall of the body and a flat wall opposite said back wall, by virtue of all of which a tool may be adjustably clamped in the body grooves between the set screws and the arcuate segment block for purposes described.

4. In a multiple tool holder wherein is provided a tool head comprising a body rotatable for adjustment about its axis; the improvement which comprises the provision of a set of transverse tool receiving grooves in the periphery of the body and a set of generally radially disposed tool receiving grooves in the front face of the body, the peripheral grooves intersecting the front grooves, each groove being defined by a flat base wall, a flat back wall normal to the base wall, and an arcuate wall opposite the back wall, said arcuate walls being curved longitudinally and transversely, a single set of block segments each having flat and curved walls to fit any and all said grooves, the curved walls of the blocks being curved on radii corresponding to the longitudinal and transverse curvatures of said arcuate walls of said grooves, and clamp screws carried by said body to cooperate with said blocks for purposes described.

PAUL A. GUENTHER.